United States Patent [19]

Cave

[11] 4,123,194
[45] Oct. 31, 1978

[54] PROFILED CHIP BREAKER

[75] Inventor: Lawrence E. Cave, Painesville, Ohio

[73] Assignee: PMC Industries, Inc., Wickliffe, Ohio

[21] Appl. No.: 810,490

[22] Filed: Jun. 27, 1977

[51] Int. Cl.² ..................... B23B 51/00; B26D 1/12
[52] U.S. Cl. ................................. 408/221; 408/57; 407/6; 10/111
[58] Field of Search .............. 408/221, 215, 216, 217, 408/218, 219, 220, 222, 223, 224, 57; 10/111, 113, 120; 407/2, 3, 4, 5, 6, 11, 61, 70, 100, 111

[56] References Cited

U.S. PATENT DOCUMENTS

| 2,848,790 | 8/1958 | McMann | 407/6 |
| 3,126,560 | 3/1964 | Jennings | 408/218 |
| 3,172,190 | 3/1965 | Beech | 407/6 |
| 3,176,330 | 4/1965 | Jennings | 408/57 |
| 3,466,721 | 9/1969 | Binns | 407/70 |

Primary Examiner—Harrison L. Hinson
Attorney, Agent, or Firm—Maky, Renner, Otto & Boisselle

[57] ABSTRACT

A chip breaker includes an abutment surface having geometry generally corresponding in profile to the geometry on the cutting edge of the associated thread chaser to permit such abutment surface to be uniformly spaced from respective roots and crests of the thread chaser and in close proximity thereto when the chaser and breaker are clampingly juxtaposed. The juxtaposed or trailing surface of the chip breaker has angularly biased, parallel grooves therein to deliver coolant past the chaser body and then into the cutting area along the respective flanks of the chip breaker and chaser geometry.

4 Claims, 4 Drawing Figures

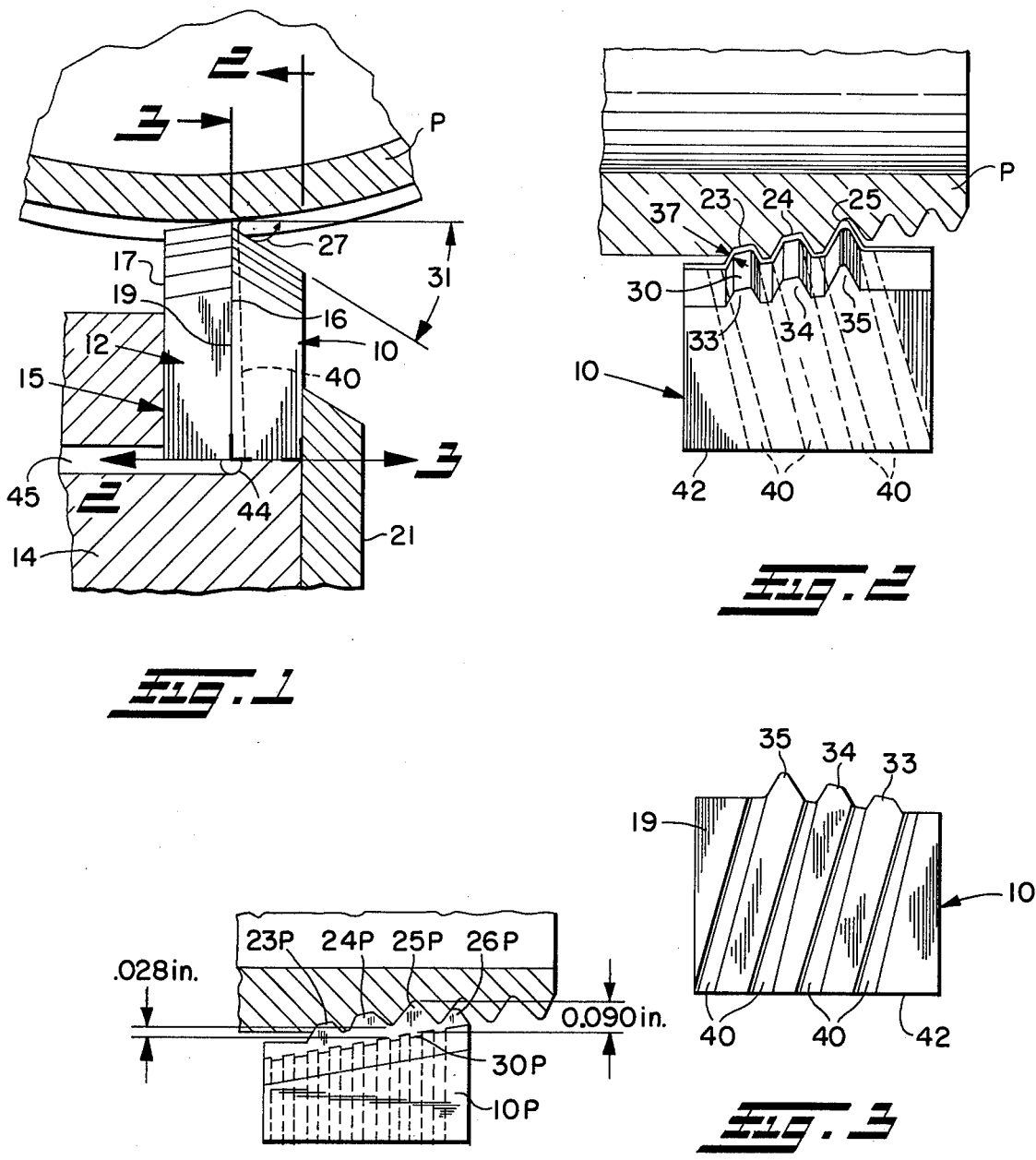
PRIOR ART

PROFILED CHIP BREAKER

BACKGROUND AND SUMMARY OF THE INVENTION

The present invention relates to a thread chaser and chip breaker combination in general and to a chip breaker having a profiled abutment edge and angularly disposed coolant grooves therein in particular.

As is well known in the art, the metallic chips removed from the workpiece by high velocity thread cutting chasers or the like of the type shown in Urbanic U.S. Pat. No. 3,629,887 are exceedingly hot and also, unless broken and/or controlled, may cause damage to the cutting tool, to the workpiece or to both. To alleviate this problem, a chip breaker having a tapered abutment surface with a top edge generally paralleling the root line of the chaser teeth was juxtaposed against the leading edge of the chaser to permit the removed chips to engage the abutment surface for abrasion and breakage thereby. The breaking action afforded by the abutment surface was enhanced by positioning the top edge of the abutment surface as close as possible to the root line of the chaser teeth and thus as close as possible to the crest line of the teeth. This positioning permitted an effective breaking action for most of the chips formed at or adjacent the crest line of the teeth. However, by so positioning the chip breaker, the working pressure on the chaser root line was increased thereby detrimentally affecting the life of the relatively costly carbide chaser. Therefore, these mutually inconsistent design parameters had to be interrelated by positioning the chip breaker only as close to the root line of the chaser teeth as possible for acceptable chaser life while sacrificing the effectiveness of the breaking action on the chips formed at or adjacent the crest line.

The above desribed chip breaker has been slightly modified over the years in attempts to improve the chip breaking action and to increase the operational life of the chaser. As shown in Jennings U.S. Pat. No. 3,126,560, a chip breaker was provided with a shoulder at one end of the beveled or tapered abutment surface adjacent the chaser tooth forming the finished cut. Such shoulder acted to direct the chip or stringer formed by the finishing tooth away from the threaded portion of the workpiece and against the beveled abutment surface for degradation thereby.

Subsequently, as shown in Jennings U.S. Pat. No. 3,176,330, a chip breaker having vertically oriented parallel grooves in its trailing surface mating with the lead face of the chaser directed coolant fluid to the cutting area behind the chip or stringer being formed by the chaser teeth during the metal removal operation. Such coolant introduction by the chip breaker grooves reliably directed the coolant to the chaser cutting edge without the inefficient prior art cutting area flooding procedure, while at the same time cooling the entire body of the chaser by passing the coolant in intimate heat exchange relationship therewith.

Even with the above recited improvements, the placement of the beveled abutment surface of the chip breaker was still controlled by the desired operational life for the relatively expensive chaser. Therefore, the efficiency of the chip breaking action afforded had to be sacrificed by moving the abutment surface away from the chaser teeth to afford such desired life even though the unbroken chips potentially resulting therefrom might cause damage to the chaser and/or to the workpiece.

Accordingly, it is a principal object of the present invention to provide a chip breaker that improves the efficiency of the breaking action without detrimentally affecting the life of the thread chaser.

It is another object of the present invention to provide a chip breaker having an abutment surface with a profile generally corresponding to the chaser cutting edge geometry so that the entire cutting edge of each tooth is uniformly spaced from the abutment surface therefor as required by the amount of material being removed by each such tooth.

It is still another object of the present invention to provide angularly oriented coolant grooves in the trailing or mating face of the chip breaker to direct the coolant fluid against the chip breaker and chaser tooth flanks.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

BRIEF DESCRIPTION OF THE DRAWING

In the drawing:

FIG. 1 is a fragmentary end elevation partially in section showing the chip breaker of the present invention in operative combination with the chaser during material removal from the workpiece;

FIG. 2 is a front elevation of the chip breaker and chaser combination as taken along the plane 2—2 in FIG. 1;

FIG. 3 is a rear elevation of the chip breaker illustrating the angularly oriented, generally parallel grooves in the rear face thereof as taken along the plane 3—3 in FIG. 1;

FIG. 4 is a front elevation of the prior art chaser and chip breaker as disclosed in U.S. Pat. No. 3,176,330.

Turning now in more detail to the drawing and initially to FIG. 1, the chip breaker of the present invention indicated generally at 10 and the high speed carbide chaser indicated generally at 12 are mounted in juxtaposed combination on a rotary die-head of the type disclosed in Sawdey U.S. Pat. No. 2,679,057 or on a tap-head of the type disclosed in Jennings U.S. Pat. No. 3,129,445. Such a rotary die-head or tap-head, hereinafter referred to generically as a threading head, may carry one or more thread cutting chasers and associated chip breakers sequentially to perform material removal from the workpiece, such as a pipe, couplings and the like, as the threading head is rotated relative to such piece, as is disclosed in Urbanic U.S. Pat. No. 3,629,887.

As shown in FIG. 1, such threading head includes a chaser and chip breaker carrier block 14 for each such pair mounted therein for selective reciprocation radially toward and away from the rotational axis of the head. Each such carrier block is provided with a shoulder 15 on the surface adjacent the workpiece.

The chaser 12, which is preferably in the form of a flat carbide body having a lead wall or face 16 facing the oncoming metal being threaded and a rear or trailing wall or face 17, is seated on such shoulder 15 by the rear wall 17 thereof engaging in radial wall of such shoulder. The chip breaker is then seated on such shoulder with the rear wall or face 19 thereof being juxtaposed on or in side to side mating relationship with the front wall 16 of the chaser. The chip breaker 10 and chaser 12 are positively held in such assembled relationship on the shoulder 15 by a clamp 21 connected to the threading head by a suitable fastener.

As shown, the chaser 12 includes a series of teeth 23-25 arranged in a row along the wall thereof adjacent the workpiece P. However, it will be appreciated that the present invention contemplates a single tooth chaser and any other chaser or forming tool having cutting geometry, with the words "tooth" or "teeth" being used hereinafter for ease and clarity in generically describing such geometry.

The teeth 23-25 at their intersection with the leading wall 16 form the cutting edge along the entire profile extent thereof. Such cutting edge makes a positive cut in the metal of the workpiece, and consequently chip, schematically shown by the arrow 27, are formed thereby along the entire length of the cutting edge and are moving outwardly from the workpiece P. Unless such hot chips are effectively broken, they can become elongated stringers that potentially will damage the workpiece and/or chaser by contact therewith.

To effectuate such breakage, the chip breaker of the present invention includes a beveled or tapered abutment surface, indicated generally at 30, in close proximity to the teeth of the chaser, such taper preferably being at an angle between 15° and 45° relative to the workpiece P as shown at 31 in FIG. 1. Such abutment surface 30 includes a row of abutment teeth 33-35 having a contour substantially of the same profile as the teeth 23-25 of the chaser 12 thereby to form, as illustrated, three pairs of aligned, associated cutting and abutment teeth 23 and 33, 24 and 34, and 25 and 35. As best shown in FIG. 2, such profile permits the chip breaker abutment surface 30 to be in close proximity to the cutting edge of the chaser, with the distance 37 between the respective abutment teeth 33-35 of the chip breaker and the cutting edge of the chaser teeth 23-25 aligned therewith being uniform across the entire cutting edge for at least each such tooth. The desired uniform spacing between each cutting edge for each tooth and its associated profiled abutment surface is selected by the amount of material being removed by that particular tooth, with a deeper cut requiring a greater uniform space therefor than a shallower cut. If the teeth are all removing equal amounts of material as generally illustrated in FIG. 2, then the spacing 37 may be uniform along the entire cutting edge of the chaser from edge to edge. With the described uniformity, all of the chips formed by a given tooth will travel substantially equal, limited distances before engagement with the chip breaker abutment surface 30 associated therewith for effective degradation thereby.

As shown in FIGS. 2 and 3, the back or trailing wall 19 of the chip breaker is provided with a plurality of angularly oriented, generally parallel grooves 40 extending from the bottom wall 42 thereof to the roots of the chip breaker teeth respectively aligned therewith. In the juxtaposed condition of the chip breaker and chaser, each of the grooves 40 is closed off by the front wall 16 of the chaser to form coolant carrying conduits. At the bottom, such grooves 40 are in fluid communication with a trough 44 at the end of duct 45 forming a part of the coolant delivery system for the rotary threading head. Such coolant delivery system is fully disclosed and described in Jennings U.S. Pat. No. 3,076,330, with the details of such system being incorporated herein by reference thereto. Such delivery system directs pressurized coolant fluid through duct 45, trough 44, and parallel grooves 40 in the back wall of the chip breaker. Such coolant passes under pressure from the grooves into the cutting area behind the chips, with such coolant, because of the angular orientation of the grooves, passing along the flanks of the chip breaker and chaser teeth positively and effectively to cool the same. Moreover, such coolant during its travel through such grooves passes in direct contact with the leading face of the chaser to cool the same because of the intimate heat exchange relationship therewith.

In accordance with the above described tooling theory, the movement of the abutment surface closer to the entire cutting edge of the chaser teeth has improved the effectiveness of the breaking action. Moreover, by employing a profiled abutment surface, the breaking action is further enhanced by the uniformity of separation between the cutting and the abutment edges at each such tooth as programmed in accordance with metal removal rates thereof.

However, contrary to such tooling theory, the placement of the abutment edge in close proximity to the entire cutting edge has not adversely affected the life of the chaser. In fact, in limited tests performed using the chip breaker of the present invention in combination with a conventional carbide chaser on oil country pipe, the operational life of such chaser was slightly improved over the life of such chaser with the prior art chip breaker disclosed in FIG. 4.

In FIG. 4, the prior art chip breaker 10P has a top edge 30P on the abutment surface that generally parallels the root line of the chaser teeth 23P-26P and is spaced from the root line a distance of 0.028 in. and from the crest line a distance of 0.090 in. In contrast, the uniform spacing between the cutting edge and breaking surface in the illustrated embodiment of FIG. 2 with improved breaking action is 0.040 in. In accordance with recognized tooling theory, this uniform spacing should decrease the life of the chaser because more abutment surface is closer to the cutting edge, but this has not proved to be the case in the noted testing. Moreover, by increasing the distance between the root line and abutment surface, the chips formed at or adjacent the root line may more freely move away from the cut without doubling back upon the work piece. The dimensions given are meant to be exemplary only since it will be appreciated that smaller or greater spacing may be used with the present invention as long as uniform spacing is maintained for each tooth, although such spacing may, as discussed, vary from tooth to tooth as required.

Although the chip breaker of the present invention has been described in terms of a thread chaser and its associated environment, it will be appreciated that such chip breaker finds utility in any metal removal environment including, but not being limited to, grooving and the like. For example, the present invention with uniform spacing could be used as an insert in the grooving or cut-off environment of Urbanic U.S. Pat. No. 3,364,544 instead of the insert disclosed therein which has the geometry of the cutting edge at different angles than the profile of the integrally formed breaking surface spaced a substantial distance therefrom.

I, therefore, particularly point out and distinctly claim as my invention:

1. A metalworking apparatus comprising, in combination, a cutting tool having cutting geometry thereon including at least two cutting teeth for removing metal chips from a workpiece and a chip breaker having an abutment surface thereon positioned in close proximity to the cutting geometry for breaking the metal chips directed thereagainst, said abutment surface having abutment teeth with the profile of each abutment tooth being the same as the cutting tooth aligned therewith to provide a uniform space therebetween across each such respective pair of aligned cutting and abutment teeth, said uniform space between respective pairs of aligned cutting and abutment teeth potentially varying from one pair to the next across the cutting geometry in accordance with the amount of chips being respectively removed by each cutting tooth, with a relative increase in chip removal by a particular cutting tooth requiring an increase in the uniform space at that cutting tooth, and vice versa.

2. The apparatus of claim 1 wherein said chip breaker has a coolant face positioned against the cutting face of the cutting tool, said coolant face having a plurality of angularly oriented, generally parallel grooves therein closed by the cutting face of the cutting tool to form conduits for coolant fluid, the angularity of such grooves being selected in accordance with the profile of the cutting and abutment teeth to result in the coolant fluid being directed by the grooves along the flanks of the cutting and abutment teeth.

3. The apparatus of claim 1 wherein the chip breaker is a unitary body and the cutting tool is a unitary body.

4. The apparatus of claim 1 wherein the entire abutment surface has the same profile tapered away from the workpiece at an angle from the edge directly proximate the cutting geometry to the edge remote therefrom.

* * * * *